US012804745B2

(12) United States Patent
Liu

(10) Patent No.: US 12,804,745 B2
(45) Date of Patent: Nov. 17, 2026

(54) BEARER CONFIGURATION METHOD AND APPARATUS, AND TERMINAL

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 406 days.

(21) Appl. No.: 18/071,672

(22) Filed: Nov. 30, 2022

(65) Prior Publication Data

US 2023/0093763 A1 Mar. 23, 2023

Related U.S. Application Data

(63) Continuation of application No. PCT/CN2021/099350, filed on Jun. 10, 2021.

(30) Foreign Application Priority Data

Jun. 11, 2020 (CN) ......................... 202010531658.0

(51) Int. Cl.
*H04W 76/15* (2018.01)
*H04W 88/04* (2009.01)

(52) U.S. Cl.
CPC ............ *H04W 76/15* (2018.02); *H04W 88/04* (2013.01)

(58) Field of Classification Search
CPC ..... H04W 76/15; H04W 88/04; H04W 76/12; H04W 76/23; H04W 76/22; H04W 40/22
See application file for complete search history.

(56) References Cited

U.S. PATENT DOCUMENTS

2014/0198708 A1* 7/2014 Lee ....................... H04W 76/14 370/312
2015/0230209 A1 8/2015 Jactat et al.
2017/0041818 A1 2/2017 Lee et al.
2017/0048922 A1 2/2017 Lee et al.
2017/0181206 A1* 6/2017 Lee ....................... H04W 76/32
2019/0387446 A1 12/2019 Xu et al.
(Continued)

FOREIGN PATENT DOCUMENTS

CN 110662299 A 1/2020
CN 110677921 A 1/2020
(Continued)

OTHER PUBLICATIONS

Extended European Search Report for Application No. 21822755.1, dated Oct. 27, 2023, 12 Pages.
(Continued)

*Primary Examiner* — Pamit Kaur
(74) *Attorney, Agent, or Firm* — BROOKS KUSHMAN P.C.

(57) ABSTRACT

A bearer configuration method and apparatus, and a terminal. The method includes: sending a first reconfiguration message to a relay terminal, where the first reconfiguration message carries configuration information of a first RLC bearer; and sending a second reconfiguration message to a second terminal, or sending, by the relay terminal, a second reconfiguration message to a second terminal, where the second reconfiguration message carries configuration information of a second RLC bearer.

17 Claims, 5 Drawing Sheets

(56) References Cited

U.S. PATENT DOCUMENTS

| | | | | |
|---|---|---|---|---|
| 2020/0163005 | A1 | 5/2020 | Rao et al. | |
| 2020/0344708 | A1* | 10/2020 | Liao | H04W 72/02 |
| 2021/0314935 | A1* | 10/2021 | Luo | H04W 72/51 |
| 2022/0361267 | A1* | 11/2022 | Wang | H04W 76/14 |
| 2023/0074899 | A1* | 3/2023 | Wang | H04W 40/12 |

FOREIGN PATENT DOCUMENTS

| | | | | |
|---|---|---|---|---|
| EP | 3393055 | A1 | 10/2018 | |
| EP | 3393099 | A1 | 10/2018 | |
| EP | 3579642 | A1 * | 12/2019 | H04W 28/0205 |
| EP | 4228327 | A1 | 8/2023 | |
| JP | 2015532545 | A | 11/2015 | |
| WO | 2018196497 | A1 | 11/2018 | |

OTHER PUBLICATIONS

First Office Action for Japanese Application No. 2022-574805, dated Oct. 17, 203, 3 Pages.

3GPP Organizational Partners "3rd Generation Partnership Project; Technicla Specification Group Services and System Aspects; Study on system enhancement for Proximity based Services (ProSe) in the 5G System (5GS) (Release 17)" 3GPP TR 23.752 V0.3.0 (Jan. 2020), 2020, 73 Pages.

3GPP Organizational Partners "3rd Generation Partnership Project; Technicla Specification Group Services and System Aspects; Study on system enhancement for Proximity based Services (ProSe) in the 5G System (5GS) (Release 17)" 3GPP TR 23.752 V0.3.0 (Jan. 2020), Track Changes Marked, 2020, 71 Pages.

International Search Report and Written Opinion for Application No. PCT /CN2021/099350, dated Sep. 8, 2021, 8 Pages.

ZTE, "Discussion on connection establishment and bearer setup", 3GPP TSG-RAN WG2 Meeting #96, R2-168149, Reno, USA, Nov. 2016, 4 Pages.

CATT. Considerations about ProSe UE-UE Relays. SA WG2 Meeting #104. S2-142853. Online. Jul. 2014. 3 pages.

3rd Generation Partnership Project. 3rd Generation Partnership Project; Technical Specification Group Radio Access Network; NR; Radio Resource Control (RRC) protocol specification (Release 16). 3GPP TS 38.331 V16.0.0. Online. Mar. 2020. 836 pages.

First Korean Office Action for Korean Patent Application No. 10-2022-7044229 mailed Mar. 25, 2025. 16 pages.

First Indian Office Action for Indian Patent Application No. 202217068756 mailed Feb. 26, 2026. 10 pages.

* cited by examiner

BEARER CONFIGURATION METHOD AND APPARATUS, AND TERMINAL

CROSS-REFERENCE TO RELATED APPLICATIONS

This application is a continuation of International Application No. PCT/CN2021/099350 filed on Jun. 10, 2021, which claims priority to Chinese Patent Application No. 202010531658.0 filed on Jun. 11, 2020, which are incorporated herein by reference in their entireties.

TECHNICAL FIELD

This application relates to the field of communication technologies, and specifically, to a bearer configuration method and apparatus, and a terminal.

BACKGROUND

A long term evolution (LTE) system starts to support a sidelink (side link, SL, or the like), used to perform data transmission directly between user equipments (UE) without using a network device.

A design of an LTE sidelink is applicable to specific public safety affairs (for example, emergency communication on a fire site or a disaster site such as an earthquake), vehicle to everything (V2X) communication, or the like. Vehicle to everything communication includes various services, for example, basic security communication, advanced driving (self-driving), platooning, and sensor extension. Because the LTE sidelink supports only broadcast communication, the LTE sidelink is mainly used for basic security communication. Other advanced V2X services with strict quality of service (QoS) requirements in terms of latency and reliability will be supported by new radio (NR) sidelink.

A 5G NR system can be used in an operating band above 6 GHz that is not supported by LTE, and supports a larger operating bandwidth, but an NR system of a current release only supports an interface between a base station and a terminal, and does not support a sidelink interface for direct communication between terminals.

The sidelink interface may also be referred to as a PC5 interface.

Current sidelink transmission mainly includes the following transmission modes: broadcast, groupcast, and unicast. As the name implies, unicast is one-to-one transmission. Groupcast is one-to-many transmission. Broadcast is also one-to-many transmission, but broadcast does not have a concept that terminals belong to a same group.

Currently, both sidelink unicast communication and sidelink groupcast communication support a physical layer hybrid automatic repeat request (HARQ) feedback mechanism.

There are a total of two resource allocation modes for sidelink terminals.

(1) A network-side device (base station) controls and performs resource allocation for each terminal.

(2) Each terminal autonomously selects resources.

In a typical terminal-to-terminal sidelink relay (UE-to-UE sidelink relay) scenario, there is a sidelink between a remote terminal (remote UE) and a relay terminal (relay UE), and the relay terminal forwards data between the remote terminal and a target terminal. In this scenario, data transmission is performed between a remote terminal 1 and a remote terminal 2, and the relay terminal implements a data forwarding function.

In a process of implementing this application, the inventors have found at least the following problem in the prior art.

In the prior art, only a configuration problem in direct communication between two terminals is resolved. For example, for direct communication between a terminal 1 and a terminal 2, configuration is performed by using a PC5 radio resource control (RRC) procedure, and a sidelink radio bearer (SLRB) and a radio link control bearer (RLC bearer) are established, so that data can be transmitted between the terminal 1 and the terminal 2 through a one-hop PC5 interface.

However, for how to perform configuration between two remote terminals, how to perform configuration between a remote terminal and a relay terminal, and how to configure two PC5 links so that data can be transmitted between the two terminals through a two-hop path or even a multi-hop path in a UE-to-UE relay architecture, there is no direct solution currently.

SUMMARY

An objective of embodiments of this application is to provide a bearer configuration method and apparatus, and a terminal.

According to a first aspect, an embodiment of this application provides a bearer configuration method. The method is applied to a first terminal and includes:

- sending a first reconfiguration message to a relay terminal, where the first reconfiguration message carries configuration information of a first radio link control RLC bearer; and
- sending a second reconfiguration message to a second terminal, or sending, by the relay terminal, a second reconfiguration message to a second terminal, where the second reconfiguration message carries configuration information of a second RLC bearer.

According to a second aspect, an embodiment of this application provides a bearer configuration method. The method is applied to a relay terminal and includes:

- receiving a first reconfiguration message sent by a first terminal, where the first reconfiguration message carries configuration information of a first radio link control RLC bearer; and
- sending a second reconfiguration message to a second terminal, or sending, by the first terminal, a second reconfiguration message to a second terminal, where the second reconfiguration message carries configuration information of a second RLC bearer.

According to a third aspect, an embodiment of this application provides a bearer configuration method. The method is applied to a second terminal and includes:

- receiving a second reconfiguration message sent by a first terminal or a relay terminal, where the second reconfiguration message carries configuration information of a second RLC bearer.

According to a fourth aspect, an embodiment of this application provides a bearer configuration apparatus. The apparatus is applied to a first terminal and includes:

- a first sending module, configured to send a first reconfiguration message to a relay terminal, where the first reconfiguration message carries configuration information of a first radio link control RLC bearer; and
- a second sending module, configured to send a second reconfiguration message to a second terminal, or send, by the relay terminal, a second reconfiguration message to a second terminal, where the second reconfiguration message carries configuration information of a second RLC bearer.

According to a fifth aspect, an embodiment of this application provides a bearer configuration apparatus. The apparatus is applied to a relay terminal and includes:

a first receiving module, configured to receive a first reconfiguration message sent by a first terminal, where the first reconfiguration message carries configuration information of a first radio link control RLC bearer; and a third sending module, configured to send a second reconfiguration message to a second terminal, or send, by the first terminal, a second reconfiguration message to a second terminal, where the second reconfiguration message carries configuration information of a second RLC bearer.

According to a sixth aspect, an embodiment of this application provides a bearer configuration apparatus. The apparatus is applied to a second terminal and includes:

a second receiving module, configured to receive a second reconfiguration message sent by a first terminal or a relay terminal, where the second reconfiguration message carries configuration information of a second RLC bearer.

According to a seventh aspect, a terminal is provided. The terminal includes a processor, a memory, and a program or instructions stored in the memory and capable of running on the processor, where when the program or instructions are executed by the processor, the steps of the method according to the first aspect are implemented, or the steps of the method according to the second aspect are implemented, or the steps of the method according to the third aspect are implemented.

According to an eighth aspect, a readable storage medium is provided. The readable storage medium stores a program or instructions, and when the program or instructions are executed by a processor, the steps of the method according to the first aspect are implemented, or the steps of the method according to the second aspect are implemented, or the steps of the method according to the third aspect are implemented.

According to a ninth aspect, a chip is provided. The chip includes a processor and a communications interface, where the communications interface is coupled to the processor, and the processor is configured to run a program or instructions on a network-side device to implement the method according to the first aspect, or implement the method according to the second aspect, or implement the method according to the third aspect.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long time evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other systems than the NR system, for example, a 6th Generation (6G) communications system.

Figure 1:
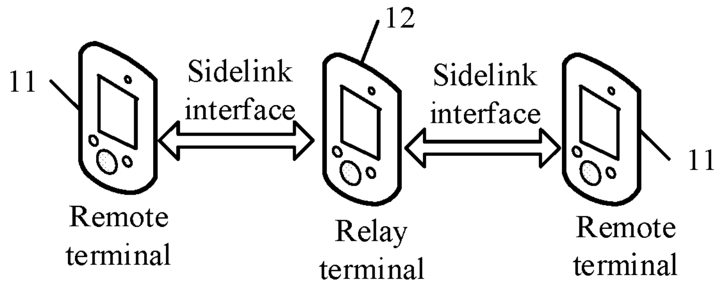
FIG. 1 is a block diagram of a wireless communications system to which an embodiment of this application can be applied.

FIG. 1 is a block diagram of a wireless communications system to which an embodiment of this application can be applied. The wireless communications system includes a remote terminal 11 and a relay terminal 12. The remote terminal 11 and the relay terminal 12 are both terminals. The terminal may also be referred to as a terminal device or user equipment (UE). The terminal may be a terminal-side device such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a hand ring, an earphone, glasses, or the like. It should be noted that a specific type of the terminal is not limited in the embodiments of this application. It should be noted that a base station in an NR system is used merely as an example in the embodiments of this application, rather than limiting a specific type of the base station.

A bearer configuration method and apparatus, and a terminal provided in the embodiments of this application are hereinafter described in detail by using specific embodiments and application scenarios thereof with reference to the accompanying drawings.

A UE-to-UE relay scenario in the embodiments of this application corresponds to two architectures: an L2 architecture and an L3 architecture.

In the L2 architecture, an L3 protocol stack (for example, RRC, SDAP, and PDCP) is located in two remote terminal entities that are peers, and a relay terminal has only a corresponding RLC bearer for forwarding data. The L2 architecture is characterized in that the relay terminal (relay UE) does not have a complete protocol stack for forwarding data. To be specific, apart from basic L2 transmission protocols such as radio link control (RLC), Media Access Control (MAC), and physical layer (Physical, PHY), the relay terminal does not have corresponding protocols such as radio resource control (Radio Resource Control, RRC), Service Data Adaptation Protocol (SDAP), and Packet Data Convergence Protocol (PDCP). The relay terminal uses only the RLC bearer to carry and transmit data of a remote terminal (remote UE). This is equivalent to presence of a peer-to-peer protocol stack such as RRC, SDAP, and PDCP between a first terminal and a second terminal, while only an RLC layer and lower protocol layers exist between the first terminal and the relay terminal, and also only an RLC layer and lower protocol layers exist between the relay terminal and the second terminal.

In the L3 architecture, the L3 protocol stack (for example, RRC, SDAP, and PDCP) is located in the relay terminal. The L3 architecture is characterized in that the relay terminal (relay UE) has a complete protocol stack. To be specific, in addition to basic L2 transmission protocol layers such as RLC, MAC and PHY, the relay terminal also has protocol layers such as RRC, SDAP, and PDCP for carrying and transmitting data of a remote terminal. This is equivalent to presence of a complete protocol stack between the first terminal and the relay terminal, and also presence of a complete protocol stack between the relay terminal and the second terminal.

It should be noted that the first terminal and the second terminal mentioned in the following embodiments of this application may also be referred to as a first remote terminal and a second remote terminal. This is not specifically limited herein.

Figure 2:
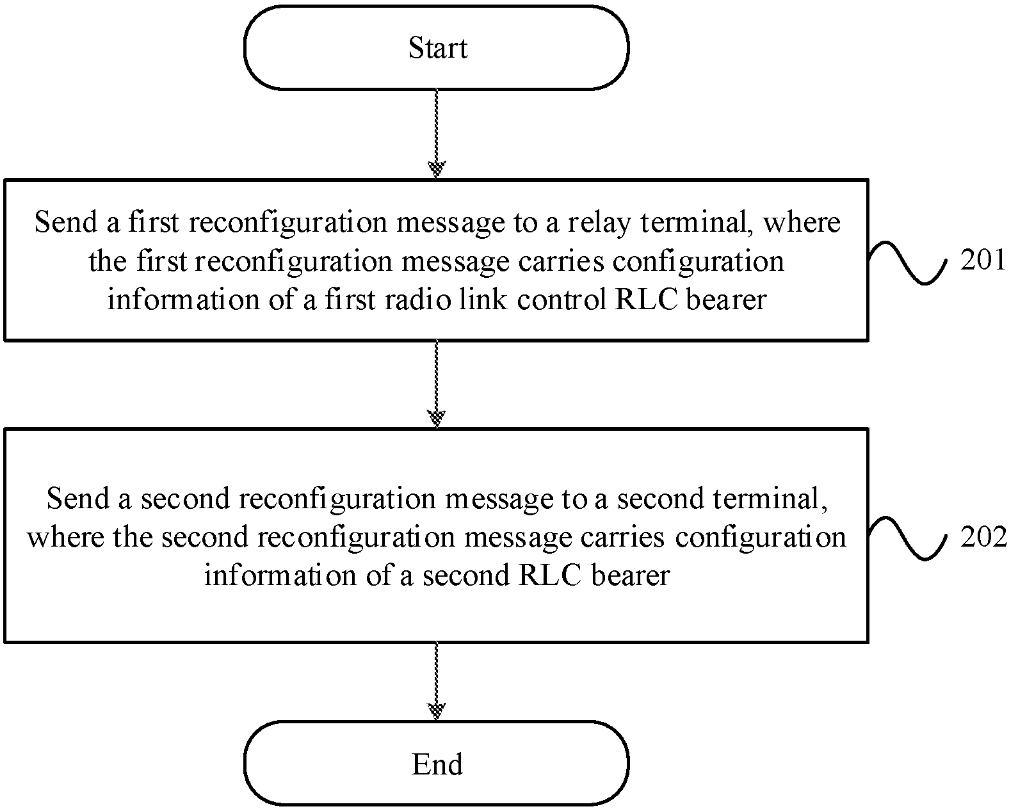
FIG. 2 is a first flowchart of steps of a bearer configuration method according to an embodiment of this application.

As shown in FIG. 2, at least one embodiment of this application provides a bearer configuration method. The method is applied to a first terminal and includes the following steps.

Step 201: Send a first reconfiguration message to a relay terminal, where the first reconfiguration message carries configuration information of a first radio link control RLC bearer. The configuration information of the first RLC bearer is used to indicate establishment of an RLC bearer between the first terminal and the relay terminal and/or indicate establishment of an RLC bearer between a second terminal and the relay terminal.

If the configuration information of the first RLC bearer is used to indicate establishment of the RLC bearer between the first terminal and the relay terminal, after the first terminal sends the first reconfiguration message to the relay terminal, the first terminal and the relay terminal establish the RLC bearer between the first terminal and the relay terminal separately based on the first reconfiguration message; or if the configuration information of the first RLC bearer is used to indicate establishment of the RLC bearer between the first terminal and the relay terminal and establishment of the RLC bearer between the second terminal and the relay terminal, the first terminal establishes the RLC bearer between the first terminal and the relay terminal based on the first reconfiguration message, and the relay terminal establishes the RLC bearer between the first terminal and the relay terminal and establishes the RLC bearer between the second terminal and the relay terminal based on the first reconfiguration message.

Step 202: Send a second reconfiguration message to the second terminal, or send, by the relay terminal, a second reconfiguration message to the second terminal, where the second reconfiguration message carries configuration information of a second RLC bearer.

In a case that the relay terminal sends the second reconfiguration message to the second terminal, the configuration information of the second RLC bearer is used to indicate establishment of the RLC bearer between the second terminal and the relay terminal; and after the relay terminal sends the second reconfiguration message to the second terminal, the relay terminal and the second terminal establish the RLC bearer between the relay terminal and the second terminal separately based on the second reconfiguration message. In this case, because the RLC bearer between the second terminal and the relay terminal is configured by the relay terminal, only configuration content of the RLC bearer needs to be consistent with configuration content of the RLC bearer between the first terminal and the relay terminal. The relay terminal may allocate an ID to the RLC bearer between the second terminal and the relay terminal, where the ID is different from that of the RLC bearer between the first terminal and the relay terminal. The configuration is flexible.

Alternatively, in a case that the first terminal sends the second reconfiguration message to the second terminal, the second reconfiguration message further carries first indication information, and the first indication information indicates that the configuration information of the second RLC bearer is used for establishment of the RLC bearer between the second terminal and the relay terminal. After the first terminal sends the second reconfiguration message to the second terminal, the second terminal establishes the RLC bearer between the second terminal and the relay terminal based on the second reconfiguration message; however, after the first terminal sends the first reconfiguration message to the relay terminal, the relay terminal establishes two RLC bearers (that is, the RLC bearer between the first terminal and the relay terminal and the RLC bearer between the second terminal and the relay terminal) simultaneously based on the first reconfiguration message, where configuration information of the two RLC bearers may be a same set of configuration information, or may be different configuration information; if the configuration information of the two RLC bearers is different configuration information, the first reconfiguration message needs to specify, in a direct or implicit indication manner, a specific RLC bearer corresponding to each set of configuration information; in this case, because all RLC bearers between the second terminal and the relay terminal are configured by the first terminal in a centralized manner, the ID of the RLC bearer between the first terminal and the relay terminal is the same as the ID of the RLC bearer between the second terminal and the relay terminal. In comparison with a configuration mode in which the configuration is performed by the relay terminal, one piece of configuration signaling is spared in this mode.

In an optional embodiment, in an L3 architecture, the first reconfiguration message further carries configuration information of a first sidelink radio bearer SLRB between the first terminal and the relay terminal; and the second reconfiguration message further carries configuration information of a second SLRB between the second terminal and the relay terminal.

In the L3 architecture, a PC5 RRC connection is established between the first terminal and the relay terminal, and the corresponding SLRB and RLC bearer are established and used to carry and transmit data of the first terminal. A PC5 RRC connection is also established between the second terminal and the relay terminal, and the corresponding SLRB and RLC bearer are also established and used to carry and transmit data of the second terminal.

When the first terminal, as an initiator or a sender, wishes to perform data transmission with the second terminal, because the first terminal is far away from the second terminal, an effect of direct PC5 communication is poor. Therefore, the relay terminal located between the two terminals is discovered and used to forward the data.

If no PC5 RRC connection has been established between the first terminal and the relay terminal (or the second terminal and the relay terminal), establishment of a PC5 RRC connection is triggered. If there is already a PC5 RRC connection between the first terminal and the relay terminal (or the second terminal and the relay terminal), the existing PC5 RRC connection may be reused directly, or a new PC5 RRC connection may be established. Because the PC5 RRC connection is identified based on a pair of a source L2 ID and a target L2 ID, a plurality of PC5 RRC connections can be established between two terminals by using different L2 IDs.

To adapt to different transmission scenarios, the first terminal and the relay terminal (or the second terminal and the relay terminal) establish a same PC5 RRC connection, that is, an existing PC5 direct communication service between the first terminal and the relay terminal (or the second terminal and the relay terminal) can be managed together with a service to be forwarded between the first terminal and the relay terminal (or the second terminal and the relay terminal), and one PC5 link is maintained. Therefore, the maintenance is convenient. Alternatively, the first terminal and the relay terminal (or the second terminal and the relay terminal) use different PC5 RRC connections, that is, one PC5 RRC connection is maintained for an existing PC5 direct communication service between the first terminal and the relay terminal (or the second terminal and the relay terminal), a service of the first terminal that needs to be forwarded by the relay terminal to the second terminal is managed separately, and another PC5 RRC connection is maintained. Because final transmission destinations and operations of data in different scenarios are different, separate maintenance is convenient for better mapping and separate operations.

In an optional embodiment, the configuration information of the first RLC bearer and the configuration information of the second RLC bearer carry identification information of an SLRB associated with the corresponding RLC bearer.

It should be noted that an SLRB configuration and an RLC bearer configuration are generally configured in two different fields, and two groups of configurations are associated by using an SLRB index. To be specific, an SLRB configuration includes an SLRB index, an RLC bearer configuration also carries an SLRB index, and a same SLRB index value corresponds to a pair of an SLRB configuration and an RLC bearer configuration. A higher-layer configuration (that is, an SLRB configuration) and a lower-layer configuration (an RLC bearer configuration) of one bearer are used together.

Optionally, in the L3 architecture, when the relay terminal receives the first reconfiguration message sent by the first terminal, the relay terminal establishes the corresponding SLRB and RLC bearer based on the first reconfiguration message, and sends a reconfiguration complete message to the first terminal. In addition, the relay terminal constructs a new PC5 RRC message (that is, the second reconfiguration message) based on the first reconfiguration message, and sends the PC5 RRC message to the second terminal to establish the SLRB and the RLC bearer between the relay terminal and the second terminal. The second terminal receives the second reconfiguration message, establishes the SLRB and the RLC bearer based on the second reconfiguration message, and sends a reconfiguration complete message to the relay terminal. Up to now, establishment of a data transmission pipeline between the first terminal and the second terminal is completed.

Optionally, in the L3 architecture, the first reconfiguration message and/or the second reconfiguration message are/is carried by PC5 RRC reconfiguration signaling. This is not specifically limited herein.

In another optional embodiment, in an L2 architecture, the second reconfiguration message may be sent by the relay terminal to the second terminal, or may be sent by the first terminal to the second terminal; if the second reconfiguration message is sent by the relay terminal to the second terminal, the second reconfiguration message may carry only the configuration information of the second RLC bearer; but if the second reconfiguration message is sent by the first terminal to the second terminal, the second reconfiguration message further carries configuration information of a third SLRB between the first terminal and the second terminal.

It should be noted that, in the L2 architecture, the configuration information of the first RLC bearer is used to indicate establishment of the RLC bearer between the first terminal and the relay terminal and establishment of the RLC bearer between the second terminal and the relay terminal. That the configuration information of the first RLC bearer is used to indicate establishment of the RLC bearer between the first terminal and the relay terminal and establishment of the RLC bearer between the second terminal and the relay terminal may use one set of configuration information or two sets of configuration information (that is, the configuration information of the first RLC bearer includes two sets of configuration information). This is not specifically limited herein.

For example, in the L2 architecture, the first terminal sends PC5 RRC reconfiguration signaling to the second terminal (the signaling is forwarded by the relay terminal and carries the configuration information of the third SLRB) to configure a related SLRB for the service, where the configuration is used to establish the SLRB between the first terminal and the second terminal. The first terminal sends PC5 RRC reconfiguration signaling to the relay terminal to configure a related RLC bearer for the service and a mapping relationship between the third SLRB and the RLC bearer, and the configuration is used to establish the RLC bearer between the first terminal and the relay terminal. The relay terminal sends PC5 RRC reconfiguration signaling to the second terminal based on the configuration to configure a related RLC bearer for the service and a mapping relationship between the RLC bearer and the SLRB, and the configuration is used to establish the RLC bearer between the second terminal and the relay terminal.

Based on the characteristic of the L2 architecture, to transmit data between the first terminal and the second terminal through the relay terminal, it is necessary to first establish an SLRB between the first terminal and the second terminal, for example, protocol layers including RRC, SDAP, and PDCP, for end-to-end data transmission. However, between the first terminal and the relay terminal, an RLC bearer needs to be established for transmitting a PDCP protocol data unit (PDU). Between the relay terminal and the second terminal, an RLC bearer also needs to be established for transmitting a PDCP PDU.

In an optional embodiment, the configuration information of the first RLC bearer and the configuration information of the second RLC bearer carry identification information of an SLRB associated with the corresponding RLC bearer.

In an optional embodiment, the configuration information of the first RLC bearer and the configuration information of the second RLC bearer further carry identification information of a PC5 link associated with the corresponding RLC bearer.

Because in the L2 architecture, the SLRB is end-to-end and the RLC bearer is divided into two segments, a mapping relationship between the SLRB and the RLC bearer cannot be configured in a conventional simultaneous configuration mode, but needs to be configured by using an enhanced mapping mode in different signaling processes. In the L2 architecture, the SLRB is configured between the first terminal and the second terminal, and an SLRB index is also valid in a PC5 link 1 corresponding to the SLRB index. The RLC bearer corresponds to a PC5 link 2 between the first terminal and the relay terminal or a PC5 link 3 between the relay terminal and the second terminal. This means that the SLRB index corresponding to the PC5 link 1 needs to be indicated in messages of the PC5 link 2 and the PC5 link 3. Due to different PC5 links, the messages cannot carry only the SLRB index, but further need to identify the corresponding PC5 link, for example, carry identification information related to the PC5 link (identities IDs of the terminals at both ends, L2 IDs of the terminals at both ends, a link ID, or the like).

In an optional embodiment, the configuration information of the third SLRB includes identification information of a PC5 link associated with the third SLRB, for example, the identities IDs of the terminals at both ends, the L2 IDs of the terminals at both ends, or the link ID.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

Figure 3:
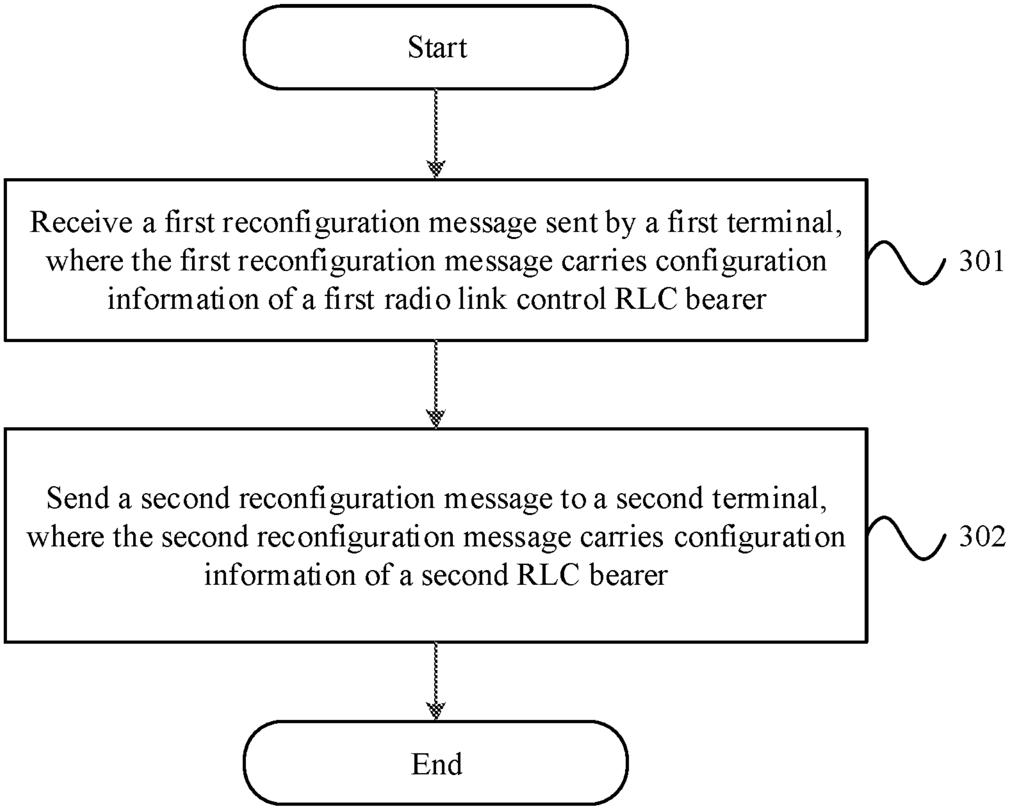
FIG. 3 is a second flowchart of steps of a bearer configuration method according to an embodiment of this application.

As shown in FIG. 3, an embodiment of this application further provides a bearer configuration method. The method is applied to a relay terminal and includes the following steps.

Step 301: Receive a first reconfiguration message sent by a first terminal, where the first reconfiguration message carries configuration information of a first radio link control RLC bearer, where the configuration information of the first RLC bearer is used to indicate establishment of an RLC bearer between the first terminal and the relay terminal and/or indicate establishment of an RLC bearer between a second terminal and the relay terminal.

If the configuration information of the first RLC bearer is used to indicate establishment of the RLC bearer between the first terminal and the relay terminal, after the first terminal sends the first reconfiguration message to the relay terminal, the first terminal and the relay terminal establish the RLC bearer between the first terminal and the relay terminal separately based on the first reconfiguration message; or if the configuration information of the first RLC bearer is used to indicate establishment of the RLC bearer between the first terminal and the relay terminal and establishment of the RLC bearer between the second terminal and the relay terminal, the first terminal establishes the RLC bearer between the first terminal and the relay terminal based on the first reconfiguration message, and the relay terminal establishes the RLC bearer between the first terminal and the relay terminal and establishes the RLC bearer between the second terminal and the relay terminal based on the first reconfiguration message.

Step 302: Send a second reconfiguration message to the second terminal, or send, by the first terminal, a second reconfiguration message to the second terminal, where the second reconfiguration message carries configuration information of a second RLC bearer.

In a case that the relay terminal sends the second reconfiguration message to the second terminal, the configuration information of the second RLC bearer is used to indicate establishment of the RLC bearer between the second terminal and the relay terminal; and after the relay terminal sends the second reconfiguration message to the second terminal, the relay terminal and the second terminal establish the RLC bearer between the relay terminal and the second terminal separately based on the second reconfiguration message. In this case, because the RLC bearer between the second terminal and the relay terminal is configured by the relay terminal, only configuration content of the RLC bearer needs to be consistent with configuration content of the RLC bearer between the first terminal and the relay terminal. The relay terminal may allocate an ID to the RLC bearer between the second terminal and the relay terminal, where the ID is different from that of the RLC bearer between the first terminal and the relay terminal. The configuration is flexible.

Alternatively, in a case that the first terminal sends the second reconfiguration message to the second terminal, the second reconfiguration message further carries first indication information, and the first indication information indicates that the configuration information of the second RLC bearer is used for establishment of the RLC bearer between the second terminal and the relay terminal. After the first terminal sends the second reconfiguration message to the second terminal, the second terminal establishes the RLC bearer between the second terminal and the relay terminal based on the second reconfiguration message; however, after the first terminal sends the first reconfiguration message to the relay terminal, the relay terminal establishes two RLC bearers (that is, the RLC bearer between the first terminal and the relay terminal and the RLC bearer between the second terminal and the relay terminal) simultaneously based on the first reconfiguration message, where configuration information of the two RLC bearers may be a same set of configuration information, or may be different configuration information; if the configuration information of the two RLC bearers is different configuration information, the first reconfiguration message needs to specify, in a direct or implicit indication manner, a specific RLC bearer corresponding to each set of configuration information; in this case, because all RCL bearers between the second terminal and the relay terminal are configured by the first terminal in a centralized manner, the ID of the RLC bearer between the first terminal and the relay terminal is the same as the ID of the RLC bearer between the second terminal and the relay terminal. In comparison with a configuration mode in which the configuration is performed by the relay terminal, one piece of configuration signaling is spared in this mode.

In an optional embodiment, in an L3 architecture, the first reconfiguration message further carries configuration information of a first sidelink radio bearer SLRB between the first terminal and the relay terminal; and the second reconfiguration message further carries configuration information of a second SLRB between the second terminal and the relay terminal.

In the L3 architecture, a PC5 RRC connection is established between the first terminal and the relay terminal, and the corresponding SLRB and RLC bearer are established and used to carry and transmit data of the first terminal. A PC5 RRC connection is also established between the second terminal and the relay terminal, and the corresponding SLRB and RLC bearer are also established and used to carry and transmit data of the second terminal.

When the first terminal, as an initiator or a sender, wishes to perform data transmission with the second terminal, because the first terminal is far away from the second terminal, an effect of direct PC5 communication is poor. Therefore, the relay terminal located between the two terminals is discovered and used to forward the data.

If no PC5 RRC connection has been established between the first terminal and the relay terminal (or the second terminal and the relay terminal), establishment of a PC5 RRC connection is triggered. If there is already a PC5 RRC connection between the first terminal and the relay terminal (or the second terminal and the relay terminal), the existing PC5 RRC connection may be reused directly, or a new PC5 RRC connection may be established. Because the PC5 RRC connection is identified based on a pair of a source L2 ID and a target L2 ID, a plurality of PC5 RRC connections can be established between two terminals by using different L2 IDs.

To adapt to different transmission scenarios, the first terminal and the relay terminal (or the second terminal and the relay terminal) establish a same PC5 RRC connection, that is, an existing PC5 direct communication service between the first terminal and the relay terminal (or the second terminal and the relay terminal) can be managed together with a service to be forwarded between the first terminal and the relay terminal (or the second terminal and the relay terminal), and one PC5 link is maintained. Therefore, the maintenance is convenient. Alternatively, the first terminal and the relay terminal (or the second terminal and the relay terminal) use different PC5 RRC connections, that is, one PC5 RRC connection is maintained for an existing PC5 direct communication service between the first terminal and the relay terminal (or the second terminal and the relay terminal), a service of the first terminal that needs to be forwarded by the relay terminal to the second terminal is managed separately, and another PC5 RRC connection is maintained. Because final transmission destinations and operations of data in different scenarios are different, separate maintenance is convenient for better mapping and separate operations.

In an optional embodiment, the configuration information of the first RLC bearer and the configuration information of the second RLC bearer carry identification information of an SLRB associated with the corresponding RLC bearer.

It should be noted that an SLRB configuration and an RLC bearer configuration are generally configured in two different fields, and two groups of configurations are associated by using an SLRB index. To be specific, an SLRB configuration includes an SLRB index, an RLC bearer configuration also carries an SLRB index, and a same SLRB index value corresponds to a pair of an SLRB configuration and an RLC bearer configuration. A higher-layer configuration and a lower-layer configuration of one bearer are used together.

Optionally, in the L3 architecture, when the relay terminal receives the first reconfiguration message sent by the first terminal, the relay terminal establishes the corresponding SLRB and RLC bearer based on the first reconfiguration message, and sends a reconfiguration complete message to the first terminal. In addition, the relay terminal constructs a new PC5 RRC message (that is, the second reconfiguration message) based on the first reconfiguration message, and sends the PC5 RRC message to the second terminal to establish the SLRB and the RLC bearer between the relay terminal and the second terminal. The second terminal receives the second reconfiguration message, establishes the SLRB and the RLC bearer based on the second reconfiguration message, and sends a reconfiguration complete message to the relay terminal. Up to now, establishment of a data transmission pipeline between the first terminal and the second terminal is completed.

It should be noted that the relay terminal needs to maintain a correct mapping relationship between two transmission pipelines (a transmission pipeline between the first terminal and the relay terminal and a transmission pipeline between the second terminal and the relay terminal) to ensure that data of the first terminal can reach the second terminal through a correct bearer pipeline. In other words, in this embodiment of this application, the method further includes:

maintaining a mapping relationship between the first SLRB and the second SLRB;

and/or maintaining a mapping relationship between the first RLC bearer and the second RLC bearer.

A specific mapping mode includes any one of the following:

(1) There is a one-to-one mapping between PC5 RRC links, and there is also a one-to-one mapping between SLRBs. For example, a PC5 link 2 is established between the first terminal and the relay terminal for a service to be forwarded, where SLRB indexes 1, 2, and 3 are established to transmit services with different attributes, and a PC5 link 3 is established between the relay terminal and the second terminal for the service to be forwarded, where SLRB indexes 1, 2, and 3 are established to transmit services with different attributes. The two groups of SLRB index numbers are mapped correspondingly in sequence.

(2) PC5 RRC links are reused, and there is a one-to-one mapping between SLRBs. For example, an existing PC5 link 1 is reused between the first terminal and the relay terminal for a service to be forwarded, where SLRB indexes 6, 7, and 8 are established to transmit services with different attributes, and an existing PC5 link 2 is reused between the relay terminal and the second terminal for the service to be forwarded, where SLRB indexes 3, 4, and 5 are established to transmit services with different attributes. The two groups of SLRB index numbers (3-6, 4-7, and 5-8) are mapped correspondingly.

(3) PC5 RRC links are reused, and SLRBs are reused. A quantity of SLRBs required is small, that is, on a basis of reusing PC5 RRC links, SLRBs can also be reused, and a detail distinguishing mode is carried in a data packet. For example, a part of data of an SLRB 3 in a first segment is mapped to an SLRB 6 in a second segment. The reason why the foregoing is a part of the data of the SLRB3 lies in that data of other target nodes may also be multiplexed on the SLRB 3, and the SLRB 6 in the second segment may further carry data having similar quality of service QoS requirements from other terminals, in addition to the data from the first terminal.

In summary, in the L3 architecture, the relay terminal participates in the configuration of the two links and maintains the mapping relationship. In subsequent data transmission, the data from the first terminal can be sent on a corresponding correct pipeline to the second terminal based on the configuration and the mapping relationship. It should be noted that the second terminal may also use the same process to establish two transmission pipelines from the second terminal to the first terminal and transmit data to the first terminal through the two transmission pipelines.

In another optional embodiment, in an L2 architecture, the second reconfiguration message may be sent by the relay terminal to the second terminal, or may be sent by the first terminal to the second terminal; if the second reconfiguration message is sent by the relay terminal to the second terminal, the second reconfiguration message may carry only the configuration information of the second RLC bearer; but if the second reconfiguration message is sent by the first terminal to the second terminal, the second reconfiguration message further carries configuration information of a third SLRB between the first terminal and the second terminal.

It should be noted that, in the L2 architecture, the configuration information of the first RLC bearer is used to indicate establishment of the RLC bearer between the first terminal and the relay terminal and establishment of the RLC bearer between the second terminal and the relay terminal. That the configuration information of the first RLC bearer is used to indicate establishment of the RLC bearer between the first terminal and the relay terminal and establishment of the RLC bearer between the second terminal and the relay terminal may use one set of configuration information or two sets of configuration information (that is, the configuration information of the first RLC bearer includes two sets of configuration information). This is not specifically limited herein.

In the L2 architecture, in a case that the second reconfiguration message is sent by the relay terminal to the second terminal, the first terminal sends PC5 RRC reconfiguration signaling to the second terminal (the signaling is forwarded by the relay terminal and carries the configuration information of the third SLRB) to configure a related SLRB for the service, where the configuration is used to establish the SLRB between the first terminal and the second terminal. The first terminal sends PC5 RRC reconfiguration signaling to the relay terminal to configure a related RLC bearer for the service and a mapping relationship between the third SLRB and the RLC bearer, and the configuration is used to establish the RLC bearer between the first terminal and the relay terminal. The relay terminal sends PC5 RRC reconfiguration signaling to the second terminal based on the configuration to configure a related RLC bearer for the service and a mapping relationship between the RLC bearer and the SLRB, and the configuration is used to establish the RLC bearer between the second terminal and the relay terminal.

For example, after basic security establishment between the first terminal and the second terminal is completed, the SLRB can be established based on requirements of service transmission, and this process is performed through an SRB 3 between the first terminal and the second terminal. Configuration content of the SLRB of the first terminal depends on a terminal status, and may come from dedicated RRC signaling of a Uu interface, a system information block SIB message, or a preconfiguration message.

The first terminal sends a configuration message of the SLRB to the second terminal through a PC5-RRC interface and the SRB 3 between the first terminal and the second terminal. After receiving the configuration message, the second terminal establishes the corresponding SLRB based on the configuration message, and returns a reconfiguration complete message. In this way, an end-to-end configuration process of the SLRB is completed.

For establishment of the RLC bearers, because the RLC bearers are between the first terminal and the relay terminal and between the relay terminal and the second terminal, it is necessary to use PC5-RRC processes between them for establishment. Configuration content of the RLC bearer of the first terminal also depends on a terminal status, and may come from dedicated RRC signaling of the Uu interface, a SIB message, or a preconfiguration message.

The first terminal sends the configuration message of the RLC bearer to the relay terminal through the PC5-RRC interface and the SRB 3 between the first terminal and the relay terminal, and configures a mapping relationship between the SLRB of the first terminal and the second terminal and the newly established RLC bearer. After receiving the configuration message, the relay terminal establishes the corresponding RLC bearer based on the configuration message, and returns a reconfiguration complete message, thereby completing a configuration process of the first RLC bearer. The relay terminal sends the configuration message of the RLC bearer to the second terminal through the PC5-RRC interface and the SRB 3 between the relay terminal and the second terminal, and configures a mapping relationship between the SLRB of the first terminal and the second terminal and the newly established RLC bearer. After receiving the configuration message, the second terminal establishes the corresponding RLC bearer based on the configuration message, and returns a reconfiguration complete message, thereby completing a configuration process of the second the RLC bearer.

In the L2 architecture, in a case that the second reconfiguration message is sent by the first terminal to the second terminal, the first terminal simultaneously configures the SLRB and the RLC bearer for the second terminal by using PC5 RRC reconfiguration signaling between the first terminal and the second terminal, where the configuration is used to establish the SLRB between the first terminal and the second terminal and establish the RLC bearer between the second terminal and the relay terminal. After receiving the configuration, the second terminal may simultaneously configure the SLRB (SLRB between the first terminal and the second terminal) and the RLC bearer (RLC bearer between the second terminal and the relay terminal).

By using the PC5 RRC signaling between the first terminal and the relay terminal, the first terminal provides an RLC bearer configuration for the relay terminal. After receiving the RLC bearer configuration, the relay terminal uses the same configuration to simultaneously establish two RLC bearers, where one RLC bearer is used to perform data transmission with the first terminal, and the other RLC bearer is used to perform data transmission with the second terminal. Alternatively, the first terminal provides two RLC bearer configurations for the relay terminal by using the PC5 RRC signaling between the first terminal and the relay terminal, and indicates that one of the RLC bearer configurations is used for establishment of the RLC bearer between the first terminal and the relay terminal, and the other RLC bearer configuration is used for establishment of the RLC bearer between the second terminal and the relay terminal. After receiving the RLC bearer configurations, the relay terminal establishes corresponding RLC bearers separately by using different RLC bearer configurations.

The relay terminal maintains a mapping relationship between the two RLC bearers. IDs of the two RLC bearers may be the same or may be different, but a common feature of the two RLC bearers is that the two RLC bearers both carry same SLRB content.

For example, after basic security establishment between the first terminal and the second terminal is completed, the SLRB can be established based on requirements of service transmission, and this process is performed through the SRB 3 between the first terminal and the second terminal. Configuration content of the SLRB of the first terminal depends on a terminal status, and may come from dedicated RRC signaling of the Uu interface, a system information block SIB message, or a preconfiguration message.

The first terminal sends the configuration message of the SLRB and the configuration message of the RLC bearer to the second terminal by using the PC5-RRC interface and the SRB 3 between the first terminal and the second terminal, and configures a mapping relationship between the SLRB of the first terminal and the second terminal and the newly established RLC bearer. After receiving the configuration messages, the second terminal establishes the corresponding SLRB and the RLC bearer between the second terminal and the relay terminal based on the configuration, and returns a reconfiguration complete message.

The first terminal sends the configuration message of the RLC bearer to the relay terminal through the PC5-RRC interface and the SRB 3 between the first terminal and the relay terminal, and configures a mapping relationship between the SLRB of the first terminal and the second terminal and the newly established RLC bearer. After receiving the configuration message, the relay terminal establishes the RLC bearer between the first terminal and the relay terminal based on the configuration message, establishes the RLC bearer between the second terminal and the relay terminal based on the same configuration message, and returns a reconfiguration complete message, thereby completing the configuration process of the first RLC bearer and the configuration process of the second RLC bearer.

Generally, based on the characteristic of the L2 architecture, to transmit data between the first terminal and the second terminal through the relay terminal, it is necessary to first establish an SLRB between the first terminal and the second terminal, for example, protocol layers including RRC, SDAP, and PDCP, for end-to-end data transmission. However, between the first terminal and the relay terminal, an RLC bearer needs to be established for transmitting a PDCP protocol data unit (PDU). Between the relay terminal and the second terminal, an RLC bearer also needs to be established for transmitting a PDCP PDU.

In an optional embodiment, the configuration information of the first RLC bearer and the configuration information of the second RLC bearer carry identification information of an SLRB associated with the corresponding RLC bearer.

In an optional embodiment, the configuration information of the first RLC bearer and the configuration information of the second RLC bearer further carry identification information of a PC5 link associated with the corresponding RLC bearer.

Because in the L2 architecture, the SLRB is end-to-end and the RLC bearer is divided into two segments, a mapping relationship between the SLRB and the RLC bearer cannot be configured in a conventional simultaneous configuration mode, but needs to be configured by using an enhanced mapping mode in different signaling processes. In the L2 architecture, the SLRB is configured between the first terminal and the second terminal, and an SLRB index is also valid in the PC5 link 1 corresponding to the SLRB index. The RLC bearer corresponds to the PC5 link 2 between the first terminal and the relay terminal or the PC5 link 3 between the relay terminal and the second terminal. This means that the SLRB index corresponding to the PC5 link 1 needs to be indicated in messages of the PC5 link 2 and the PC5 link 3. Due to different PC5 links, the messages cannot carry only the SLRB index, but further need to identify the corresponding PC5 link, for example, carry identification information related to the PC5 link (identities IDs of the terminals at both ends, L2 IDs of the terminals at both ends, a link ID, or the like).

In an optional embodiment, the configuration information of the third SLRB includes identification information of a PC5 link associated with the third SLRB, for example, the identities IDs of the terminals at both ends, the L2 IDs of the terminals at both ends, or the link ID.

In the L2 architecture, the relay terminal does not parse PC5-S signaling content. In particular, the relay terminal cannot read content after security protection, but only maps an L2 address to facilitate data transmission between the terminals at both ends.

In particular, because the relay terminal also needs to establish RLC bearers with the first terminal and the second terminal separately in the subsequent process, PC5 signaling is required to send the related configuration. Therefore, in the process of establishing security and a PC5 RRC connection between the first terminal and the second terminal, the relay terminal also establishes security and a PC5 RRC connection with the two terminals separately. For example, when the second terminal receives a first request message forwarded by the relay terminal and determines to respond to the service of the first terminal, the second terminal not only establishes security and the subsequent PC5 RRC connection with the first terminal, but also initiates security establishment and the subsequent PC5 RRC process to the relay terminal simultaneously, because the second terminal can know, from hop count information or relay information, that this is a service to be forwarded instead of a direct connection service. The signaling from the second terminal to the first terminal and the signaling from the second terminal to the relay terminal may use different link ID/L2 ID pairs (for example, for the second terminal, an L2 ID 1 of the relay terminal is unique, but the second terminal can use its own L2 ID 2 to send data destined for the first terminal and use an L2 ID 3 to send data destined for the relay terminal, and the second terminal needs to inform the relay terminal that the L2 ID 2 and the L2 ID 3 are both IDs of the second terminal and binds a relay architecture) for management and sending, but the terminals at both ends need to record a mapping relationship of the foregoing different link ID/L2 ID pairs. Alternatively, a same link ID/L2 ID pair may be used for management and sending. An advantage of this is that management can be convenient because all related signaling is centralized in a link ID/L2 ID pair for sending. If a link ID/L2 ID pair is used for sending, it is necessary to explicitly distinguish which data is destined for the first terminal and which data is destined for the relay terminal. For example, a simplest way is: the signaling from the second terminal to the relay terminal is transmitted by using an SLRB 0, an SLRB 1, an SLRB 2, and an SLRB 3, and the signaling from the second terminal to the first terminal is transmitted by using an SLRB 4, an SLRB 5, an SLRB 6, and an SLRB 7; or although the two types of signaling are both transmitted by using the same SLRB 0, SLRB 1, SLRB 2, and SLRB 3, the signaling itself carries information indicating whether the signaling is destined for the relay terminal or the first terminal. Similarly, the relay terminal also needs to initiate security establishment to the first terminal and subsequent establishment of the PC5 RRC connection while establishing security for forwarding from the second terminal to the first terminal. Pipeline management and distinguishing are similar to those between the relay terminal and the second terminal. Details are not described herein again.

In an optional embodiment, the method further includes:

maintaining a mapping relationship between the first SLRB and the second SLRB;

and/or maintaining a mapping relationship between the first RLC bearer and the second RLC bearer.

The method further includes:

maintaining a mapping relationship between RLC bearers associated with a same SLRB.

In an L2 architecture configuration mode, in a case that the second reconfiguration message is sent by the relay terminal to the second terminal, because the SLRB is configured by using the end-to-end PC5 RRC connection (denoted as an RRC connection 1) between the first terminal and the second terminal, and the corresponding RLC bearers are configured respectively by using the PC5 RRC connection (denoted as an RRC connection 2) between the first terminal and the relay terminal and the PC5 RRC connection (denoted as an RRC connection 3) between the second terminal and the relay terminal, a mapping relationship between one SLRB and two RLC bearers also needs to be configured. This involves an association of three PC5 RRC connections, and a specific association mode includes either of the following:

(1) Each link ID/L2 ID pair (link ID/L2 ID Pair) is the same. For example, during transmission between the first terminal and the relay terminal, signaling of the RRC connection 1 and signaling of the RRC connection 2 are transmitted by using a same link ID/L2 ID pair, that is, link pipelines are the same. In this case, the transmitted signaling definitely has an association relationship. For example, the SLRB index is unique in the link and can be used directly. In this mode, because the two types of signaling pipelines are consistent, different signaling types need to be distinguished in other manners. For example, the signaling is carried by different SRBs, or the signaling is carried by a same SRB but distinguishing information such as type or target node information is also carried in a message.

(2) Each link ID/L2 ID pair is different. For example, during transmission between the first terminal and the relay terminal, the signaling of the RRC connection 1 and the signaling of the RRC connection 2 are transmitted by using different link ID/L2 ID pairs. Link pipelines are inconsistent, and the signaling types can be directly distinguished (data in different pipelines reaches different destination nodes). In this case, an association relationship of the transmitted signaling needs to be indicated in other manners. For example, an association between two link ID/L2 ID pairs is indicated in the signaling (for example, a link ID 1 is used to transmit the signaling of the RRC connection 1 between the first terminal and the relay terminal, a link ID 2 is used to transmit the signaling of the RRC connection 2 between the first terminal and the relay terminal, the two links serve the same relay architecture, and an RLC bearer in the link 2 and an SLRB in the link 1 are mapped based on the same SLRB index), or although RLC bearer configuration signaling is sent on the link 2, for the bearer configured on the link 1, the corresponding link to be configured is specified in the configuration signaling.

In the L2 architecture configuration mode, in a case that the second reconfiguration message is sent by the first terminal to the second terminal, because the SLRB between the first terminal and the second terminal and the RLC bearer between the second terminal and the relay terminal are configured by using the end-to-end PC5 RRC connection (denoted as an RRC connection 4) between the first terminal and the second terminal, and the RLC bearer between the first terminal and the relay terminal is configured by using the PC5 RRC connection (denoted to as an RRC connection 5) between the first terminal and the relay terminal, a mapping relationship between one SLRB and two RLC bearers also needs to be configured. This involves an association of two PC5 RRC connections, and a specific association mode includes either of the following:

(1) Each link ID/L2 ID pair (link ID/L2 ID Pair) is the same. For example, during transmission between the first terminal and the relay terminal, signaling of the RRC connection 4 and signaling of the RRC connection 5 are transmitted by using a same link ID/L2 ID pair, that is, link pipelines are the same. In this case, the transmitted signaling definitely has an association relationship. For example, the SLRB index is unique in the link and can be used directly. In this mode, because the two types of signaling pipelines are consistent, different signaling types need to be distinguished in other manners. For example, the signaling is carried by different SRBs, or the signaling is carried by a same SRB but distinguishing information such as type or target node information is also carried in a message.

(2) Each link ID/L2 ID pair is different. For example, during transmission between the first terminal and the relay terminal, the signaling of the RRC connection 4 and the signaling of the RRC connection 5 are transmitted by using different link ID/L2 ID pairs. Link pipelines are inconsistent, and the signaling types can be directly distinguished (data in different pipelines reaches different destination nodes). In this case, an association relationship of the transmitted signaling needs to be indicated in other manners. For example, an association between two link ID/L2 ID pairs is indicated in the signaling (for example, a link ID 3 is used to transmit the signaling of the RRC connection 4 between the first terminal and the second terminal, a link ID 4 is used to transmit the signaling of the RRC connection 5 between the first terminal and the relay terminal, the two links serve the same relay architecture, and an RLC bearer in the link 5 and an SLRB in the link 4 are mapped based on the same SLRB index), or although RLC bearer configuration signaling is sent on the link 5, for the bearer configured on the link 4, the corresponding link to be configured is specified in the configuration signaling.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

Figure 4:
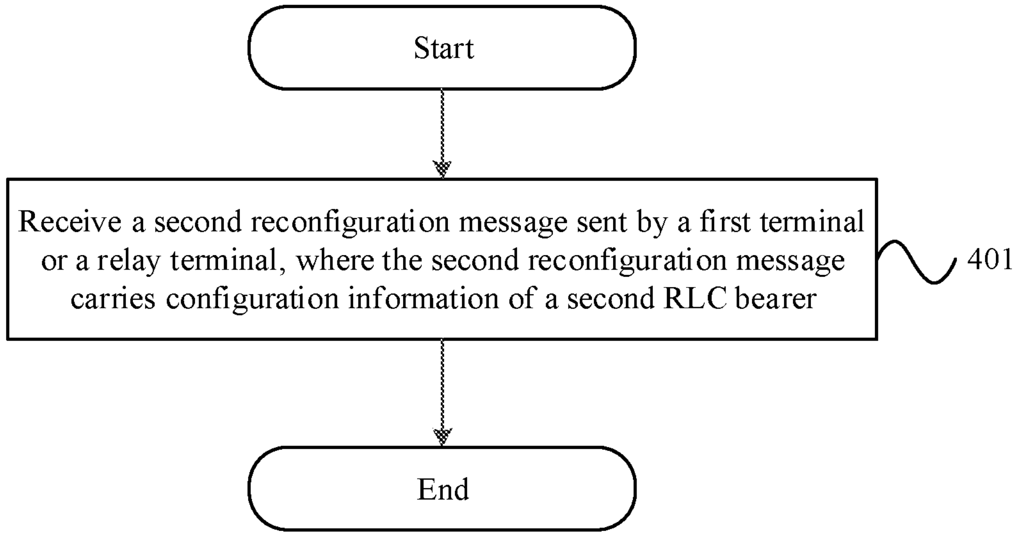
FIG. 4 is a third flowchart of steps of a bearer configuration method according to an embodiment of this application.

As shown in FIG. 4, an embodiment of this application further provides a bearer configuration method. The method is applied to a second terminal and includes the following step.

Step 401: Receive a second reconfiguration message sent by a first terminal or a relay terminal, where the second reconfiguration message carries configuration information of a second RLC bearer.

In an optional embodiment, in a case that the second reconfiguration message sent by the relay terminal is received, the configuration information of the second RLC bearer is used to indicate establishment of an RLC bearer between the second terminal and the relay terminal; and after the relay terminal sends the second reconfiguration message to the second terminal, the relay terminal and the second terminal establish the RLC bearer between the relay terminal and the second terminal separately based on the second reconfiguration message. In this case, because the RLC bearer between the second terminal and the relay terminal is configured by the relay terminal, only configuration content of the RLC bearer needs to be consistent with configuration content of an RLC bearer between the first terminal and the relay terminal. The relay terminal may allocate an ID to the RLC bearer between the second terminal and the relay terminal, where the ID is different from that of the RLC bearer between the first terminal and the relay terminal. The configuration is flexible.

Alternatively, in a case that the second reconfiguration message sent by the first terminal is received, the second reconfiguration message further carries first indication information, and the first indication information indicates that the configuration information of the second RLC bearer is used for establishment of the RLC bearer between the second terminal and the relay terminal. After the first terminal sends the second reconfiguration message to the second terminal, the second terminal establishes the RLC bearer between the second terminal and the relay terminal based on the second reconfiguration message; however, after the first terminal sends a first reconfiguration message to the relay terminal, the relay terminal establishes two RLC bearers (that is, the RLC bearer between the first terminal and the relay terminal and the RLC bearer between the second terminal and the relay terminal) simultaneously based on the first reconfiguration message, where configuration information of the two RLC bearers may be a same set of configuration information, or may be different configuration information; if the configuration information of the two RLC bearers is different configuration information, the first reconfiguration message needs to specify, in a direct or implicit indication manner, a specific RLC bearer corresponding to each set of configuration information; in this case, because all RCL bearers between the second terminal and the relay terminal are configured by the first terminal in a centralized manner, the ID of the RLC bearer between the first terminal and the relay terminal is the same as the ID of the RLC bearer between the second terminal and the relay terminal. In comparison with a configuration mode in which the configuration is performed by the relay terminal, one piece of configuration signaling is spared in this mode.

In another optional embodiment, in an L2 architecture, the second reconfiguration message may be sent by the relay terminal to the second terminal, or may be sent by the first terminal to the second terminal. In an L3 architecture, the second reconfiguration message is sent by the relay terminal to the second terminal.

In the L2 architecture, if the second reconfiguration message is sent by the relay terminal to the second terminal, the second reconfiguration message may carry only the configuration information of the second RLC bearer; but if the second reconfiguration message is sent by the first terminal to the second terminal, the second reconfiguration message further carries configuration information of a third sidelink radio bearer SLRB between the first terminal and the second terminal.

In an optional embodiment, the configuration information of the third SLRB includes identification information of a PC5 link associated with the third SLRB.

Because in the L2 architecture, the SLRB is end-to-end and the RLC bearer is divided into two segments, a mapping relationship between the SLRB and the RLC bearer cannot be configured in a conventional simultaneous configuration mode, but needs to be configured by using an enhanced mapping mode in different signaling processes. In the L2 architecture, the SLRB is configured between the first terminal and the second terminal, and an SLRB index is also valid in a PC5 link 1 corresponding to the SLRB index. The RLC bearer corresponds to a PC5 link 2 between the first terminal and the relay terminal or a PC5 link 3 between the relay terminal and the second terminal. This means that the SLRB index corresponding to the PC5 link 1 needs to be indicated in messages of the PC5 link 2 and the PC5 link 3. Due to different PC5 links, the messages cannot carry only the SLRB index, but further need to identify the corresponding PC5 link, for example, carry identification information related to the PC5 link (identities IDs of the terminals at both ends, L2 IDs of the terminals at both ends, a link ID, or the like).

In the L3 architecture, if the second reconfiguration message is sent by the relay terminal, the second reconfiguration message further carries configuration information of a second SLRB between the second terminal and the relay terminal.

In an optional embodiment, the configuration information of the second RLC bearer carries identification information of an SLRB associated with the corresponding RLC bearer.

The configuration information of the second RLC bearer further carries identification information of a PC5 link associated with the corresponding RLC bearer.

It should be noted that an SLRB configuration and an RLC bearer configuration are generally configured in two different fields, and two groups of configurations are associated by using an SLRB index. To be specific, an SLRB configuration includes an SLRB index, an RLC bearer configuration also carries an SLRB index, and a same SLRB index value corresponds to a pair of an SLRB configuration and an RLC bearer configuration. A higher-layer configuration (that is, an SLRB configuration) and a lower-layer configuration (an RLC bearer configuration) of one bearer are used together.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

It should be noted that in the L3 architecture, PC5 SRBs used for signaling transmission include:

SRB 0: It transmits PC5-S signaling without security protection (PC5-S is V2X higher layer signaling and falls within a core network research scope), for example, a direct communication request message. In a relay operation, the signaling can be reused or new signaling may be defined to carry relay-related request information in similar request messages, which is, for example, relay acceptable, a current hop number, for example, an initial node setting of 0 hops, and service information that needs to be relayed.

SRB 1: It transmits PC5-S signaling related to a security activation operation. When the relay terminal determines to serve the first terminal, generally a corresponding suitable second terminal also discovers the relay terminal, and link quality, service requirements, and the like are all satisfied. In this case, security needs to be activated between the relay terminal and the first terminal first, and “direct security mode command” and “direct security mode complete” message transmission is performed to activate security.

SRB 2: After security activation, it transmits protected PC5-S signaling.

SRB 3: After security activation, it transmits protected PC5-RRC signaling. The bearer configuration between the relay terminal and the first terminal is transmitted through the SRB 3.

For the L2 architecture, the signaling transmission rules of the foregoing four SRBs can still be followed, but a specific process is different from that of the L3 architecture.

The first terminal still uses the SRB 0 to transmit the PC5-S signaling without security protection (a source L2 ID is an address of the first terminal, and a destination L2 ID is a broadcast address), and the signaling carries service information of the first terminal, for example, whether the relay architecture is acceptable, specific information of the relay architecture, such as a hop count limit and a rate, and a current hop count. If the first terminal is an originating terminal, the hop count may be 0.

The relay terminal receives the information. Although the relay terminal is not interested in the service, the relay terminal can forward the service for the first terminal based on various conditions, for example, quality of the link from the first terminal meets a requirement, and the relay terminal's capability can support service forwarding. Therefore, the relay terminal forwards the request message of the first terminal. The SRB 0 is still used to forward the request message of the first terminal, where content of request information remains unchanged, but the address is changed (the source L2 ID is changed to an address of the relay terminal, and the destination L2 ID is a broadcast address), and the hop count is increased by 1.

The second terminal receives the request message, and finds that the second terminal is interested in the service and meets basic relay conditions, for example, a hop count requirement is met, and quality of the link to the relay terminal meets the requirement. In this case, the second terminal initiates a security activation process to the originating terminal. This process is based on higher layer information, because the higher layer information cannot be modified by the relay terminal and is still content provided for the first terminal. This process is a unicast process, the source L2 ID is an address of the second terminal, and the destination L2 ID is the address that receives the request, that is, the address of the relay terminal. Then the security activation signaling is sent to the relay terminal.

The relay terminal receives the security activation signaling, and can learn, from the specific higher layer information or from the used destination L2 ID (for example, the relay terminal allocates different L2 IDs to different links, and this destination L2 ID is dedicated to forwarding data for the first terminal and the second terminal), that this is (security activation) information for the first terminal, then changes the destination L2 ID to the address of the first terminal, changes the source L2 ID to the address of the relay terminal, and sends the security activation signaling to the first terminal. The first terminal receives the security activation signaling forwarded by the relay terminal, performs security processing, and returns a response, where the response is still forwarded by the relay terminal to the second terminal.

Up to now, the relay terminal maintains the corresponding address mapping for the two links. This pair of addresses, the address of the first terminal and the address 1 of the relay terminal, is used for communication between the relay terminal and the first terminal. This pair of addresses, the address 2 of the relay terminal and the address of the second terminal, is used for communication between the relay terminal and the second terminal. In addition, the relay terminal maintains a one-to-one mapping relationship between the two pairs of addresses, so that an addressing relationship based on which the first terminal sends a data packet to the second terminal through the relay terminal can be established.

It should be further noted that the content contained in the first reconfiguration message and/or the second reconfiguration message sent by the first terminal may come from a serving base station of the first terminal, for example, may be obtained from a dedicated RRC message through a Uu interface, a SIB message, or a preconfiguration message.

When the first terminal is in an RRC connected state of the Uu interface, the first terminal reports, to a serving cell, QoS information of the service of the first terminal that needs to be transmitted through the relay, including detailed QoS configuration information, rate information, transmission distance information, even information about a quantity of peer terminals of the terminal, and the like. The serving cell performs related configurations of the SLRB and RLC bearer on the first terminal based on the reported information. The first terminal receives the configurations of the SLRB and the RLC bearer sent over the Uu interface, constructs a PC5 RRC reconfiguration message, and sends the corresponding configuration information of the SLRB and the RLC bearer to the relay terminal.

When the first terminal is in an RRC idle or inactive state of the Uu interface, the first terminal reads SIB information of the serving cell, and finds corresponding configurations, that is, related configurations of the SLRB and the RLC bearer, from the SIB information based on the QoS information of the service of the first terminal that needs to be transmitted through the relay, including the detailed QoS configuration information, rate information, transmission distance information, even information about a quantity of peer terminals of the relay, and the like. The first terminal constructs a PC5 RRC reconfiguration message, and sends the corresponding configuration information of the SLRB and the RLC bearer to the relay terminal.

When the first terminal is in an offline state of the Uu interface, the first terminal finds corresponding configurations, that is, related configurations of the SLRB and the RLC bearer, from preconfiguration information based on PC5 preconfiguration information of the first terminal, for the QoS information of the service of the first terminal that needs to be transmitted through the relay, including the detailed QoS configuration information, rate information, transmission distance information, even information about a quantity of peer terminals of the relay, and the like. The first terminal constructs a PC5 RRC reconfiguration message, and sends the corresponding configuration information of the SLRB and the RLC bearer to the relay terminal.

It should be noted that the bearer configuration method provided in the embodiment of this application may be performed by a bearer configuration apparatus, or a control module for performing the bearer configuration method in the bearer configuration apparatus. A bearer configuration apparatus provided in an embodiment of this application is described by assuming that the bearer configuration apparatus performs the bearer configuration method in this embodiment of this application.

Figure 5:
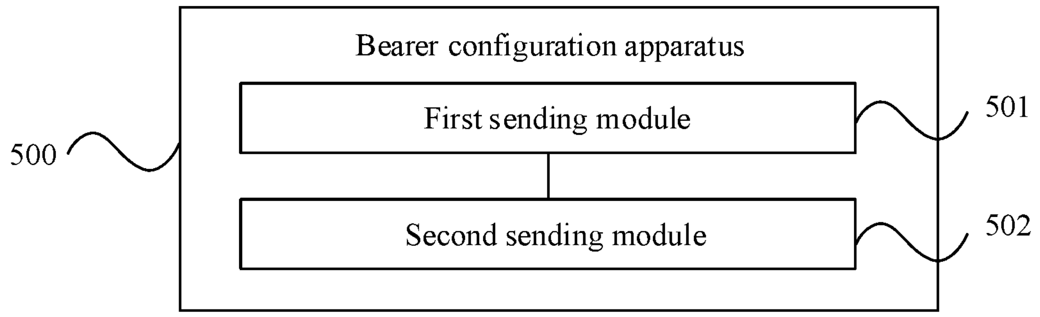
FIG. 5 is a first schematic structural diagram of a bearer configuration apparatus according to an embodiment of this application.

As shown in FIG. 5, an embodiment of this application further provides a bearer configuration apparatus 500. The apparatus is applied to a first terminal and includes:

a first sending module 501, configured to send a first reconfiguration message to a relay terminal, where the first reconfiguration message carries configuration information of a first radio link control RLC bearer; and a second sending module 502, configured to send a second reconfiguration message to a second terminal, or send, by the relay terminal, a second reconfiguration message to a second terminal, where the second reconfiguration message carries configuration information of a second RLC bearer.

In an optional embodiment, the configuration information of the first RLC bearer is used to indicate establishment of an RLC bearer between the first terminal and the relay terminal and/or indicate establishment of an RLC bearer between the second terminal and the relay terminal.

In an optional embodiment, in a case that the relay terminal sends the second reconfiguration message to the second terminal, the configuration information of the second RLC bearer is used to indicate establishment of an RLC bearer between the second terminal and the relay terminal; or in a case that the first terminal sends the second reconfiguration message to the second terminal, the second reconfiguration message further carries first indication information, and the first indication information indicates that the configuration information of the second RLC bearer is used for establishment of an RLC bearer between the second terminal and the relay terminal.

In an optional embodiment, the first reconfiguration message further carries configuration information of a first sidelink radio bearer SLRB between the first terminal and the relay terminal; and the second reconfiguration message further carries configuration information of a second SLRB between the second terminal and the relay terminal.

In an optional embodiment, in a case that the second reconfiguration message is sent to the second terminal, the second reconfiguration message further carries configuration information of a third SLRB between the first terminal and the second terminal.

In an optional embodiment, the configuration information of the first RLC bearer and the configuration information of the second RLC bearer carry identification information of an SLRB associated with the corresponding RLC bearer.

In an optional embodiment, the configuration information of the first RLC bearer and the configuration information of the second RLC bearer further carry identification information of a PC5 link associated with the corresponding RLC bearer.

In an optional embodiment, the configuration information of the third SLRB includes identification information of a PC5 link associated with the third SLRB.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

It should be noted that the bearer configuration apparatus provided in this embodiment of this application is an apparatus capable of performing the foregoing bearer configuration method, and all embodiments of the foregoing bearer configuration method are applicable to the apparatus, with the same or similar beneficial effects achieved.

Figure 6:
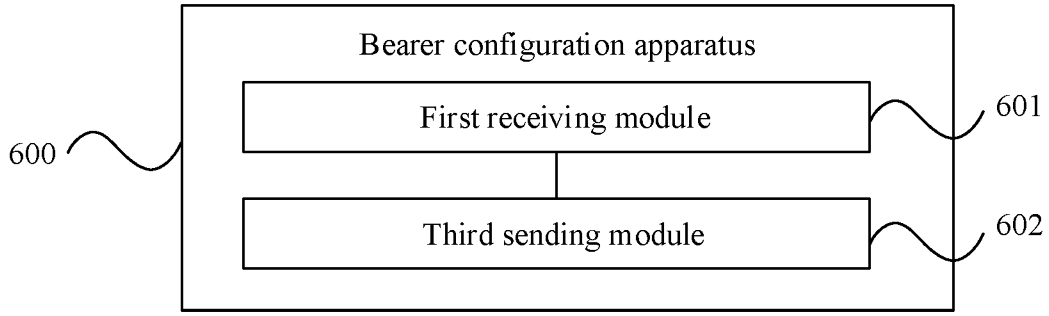
FIG. 6 is a second schematic structural diagram of a bearer configuration apparatus according to an embodiment of this application.

As shown in FIG. 6, an embodiment of this application further provides a bearer configuration apparatus 600. The apparatus is applied to a relay terminal and includes:

a first receiving module 601, configured to receive a first reconfiguration message sent by a first terminal, where the first reconfiguration message carries configuration information of a first radio link control RLC bearer; and a third sending module 602, configured to send a second reconfiguration message to a second terminal, or send, by the first terminal, a second reconfiguration message to a second terminal, where the second reconfiguration message carries configuration information of a second RLC bearer.

In an optional embodiment, the configuration information of the first RLC bearer is used to indicate establishment of an RLC bearer between the first terminal and the relay terminal and/or indicate establishment of an RLC bearer between the second terminal and the relay terminal.

In an optional embodiment, in a case that the relay terminal sends the second reconfiguration message to the second terminal, the configuration information of the second RLC bearer is used to indicate establishment of an RLC bearer between the second terminal and the relay terminal; or in a case that the first terminal sends the second reconfiguration message to the second terminal, the second reconfiguration message further carries first indication information, and the first indication information indicates that the configuration information of the second RLC bearer is used for establishment of an RLC bearer between the second terminal and the relay terminal.

In an optional embodiment, the first reconfiguration message further carries configuration information of a first sidelink radio bearer SLRB between the first terminal and the relay terminal; and the second reconfiguration message further carries configuration information of a second SLRB between the second terminal and the relay terminal.

In an optional embodiment, in a case that the first terminal sends the second reconfiguration message to the second terminal, the second reconfiguration message further carries configuration information of a third SLRB between the first terminal and the second terminal.

In an optional embodiment, the configuration information of the first RLC bearer and the configuration information of the second RLC bearer carry identification information of an SLRB associated with the corresponding RLC bearer.

In an optional embodiment, the configuration information of the first RLC bearer and the configuration information of the second RLC bearer further carry identification information of a PC5 link associated with the corresponding RLC bearer.

In an optional embodiment, the configuration information of the third SLRB includes identification information of a PC5 link associated with the third SLRB.

In an optional embodiment, the apparatus further includes:

a first maintenance module, configured to maintain a mapping relationship between the first SLRB and the second SLRB;

and/or maintain a mapping relationship between the first RLC bearer and the second RLC bearer.

In an optional embodiment, the apparatus further includes:

a second maintenance module, configured to maintain a mapping relationship between RLC bearers associated with a same SLRB.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

It should be noted that the bearer configuration apparatus provided in this embodiment of this application is an apparatus capable of performing the foregoing bearer configuration method, and all embodiments of the foregoing bearer configuration method are applicable to the apparatus, with the same or similar beneficial effects achieved.

Figure 7:
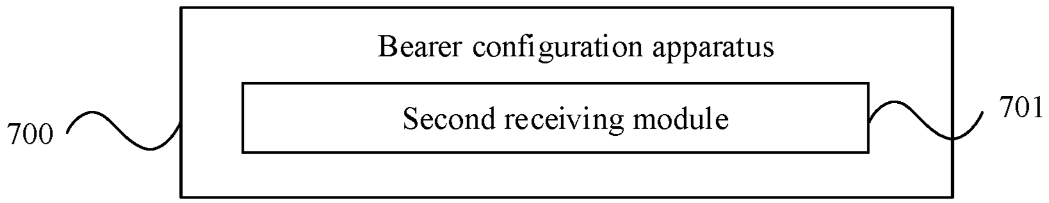
FIG. 7 is a third schematic structural diagram of a bearer configuration apparatus according to an embodiment of this application.

As shown in FIG. 7, an embodiment of this application further provides a bearer configuration apparatus 700. The apparatus is applied to a second terminal and includes:

a second receiving module 701, configured to receive a second reconfiguration message sent by a first terminal or a relay terminal, where the second reconfiguration message carries configuration information of a second RLC bearer.

In an optional embodiment, in a case that the second reconfiguration message sent by the relay terminal is received, the configuration information of the second RLC bearer is used to indicate establishment of an RLC bearer between the second terminal and the relay terminal;

or in a case that the second reconfiguration message sent by the first terminal is received, the second reconfiguration message further carries first indication information, and the first indication information indicates that the configuration information of the second RLC bearer is used for establishment of an RLC bearer between the second terminal and the relay terminal.

In an optional embodiment, if the second reconfiguration message is sent by the first terminal, the second reconfiguration message further carries configuration information of a third sidelink radio bearer SLRB between the first terminal and the second terminal.

In an optional embodiment, the configuration information of the third SLRB includes identification information of a PC5 link associated with the third SLRB.

In an optional embodiment, if the second reconfiguration message is sent by the relay terminal, the second reconfiguration message further carries configuration information of a second SLRB between the second terminal and the relay terminal.

In an optional embodiment, the configuration information of the second RLC bearer carries identification information of an SLRB associated with the corresponding RLC bearer.

In an optional embodiment, the configuration information of the second RLC bearer further carries identification information of a PC5 link associated with the corresponding RLC bearer.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

It should be noted that the bearer configuration apparatus provided in this embodiment of this application is an apparatus capable of performing the foregoing bearer configuration method, and all embodiments of the foregoing bearer configuration method are applicable to the apparatus, with the same or similar beneficial effects achieved.

The bearer configuration apparatus in this embodiment of this application may be a terminal, or may be a component, an integrated circuit, or a chip in a terminal. The apparatus may be a mobile electronic device, or may be a nonmobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The nonmobile electronic device may be a server, a network attached storage (NAS), a personal computer (PC), a television (TV), a teller machine, a self-service machine, or the like. This is not specifically limited in this embodiment of this application.

The bearer configuration apparatus in this embodiment of this application may be an apparatus having an operating system. The operating system may be an Android operating system, an iOS operating system, or other possible operating systems, and is not specifically limited in this embodiment of this application.

The bearer configuration apparatus provided in this embodiment of this application is capable of implementing the processes implemented in the method embodiments in FIG. 2 to FIG. 4. To avoid repetition, details are not described herein again.

Figure 8:
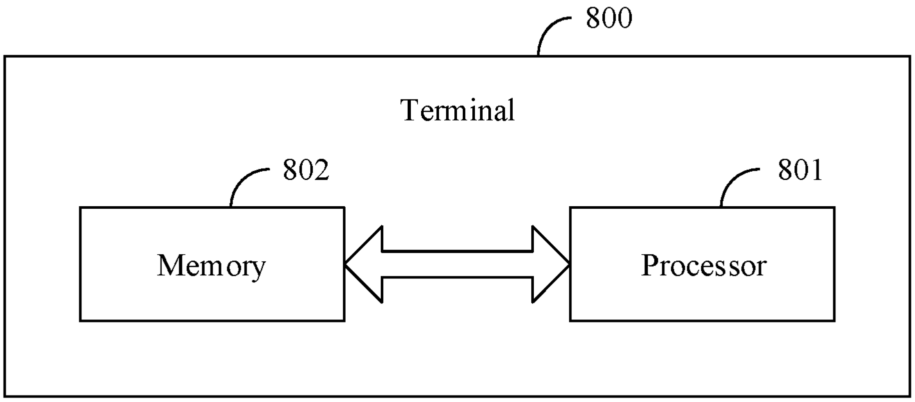
FIG. 8 is a first schematic structural diagram of a terminal according to an embodiment of this application.

Optionally, as shown in FIG. 8, an embodiment of this application further provides a terminal, including a processor 801, a memory 802, and a program or instructions stored in the memory 802 and capable of running on the processor 801. When the program or instructions are executed by the processor 801, each process of the foregoing bearer configuration method embodiment is implemented, with the same technical effect achieved. To avoid repetition, details are not described herein again.

Figure 9:
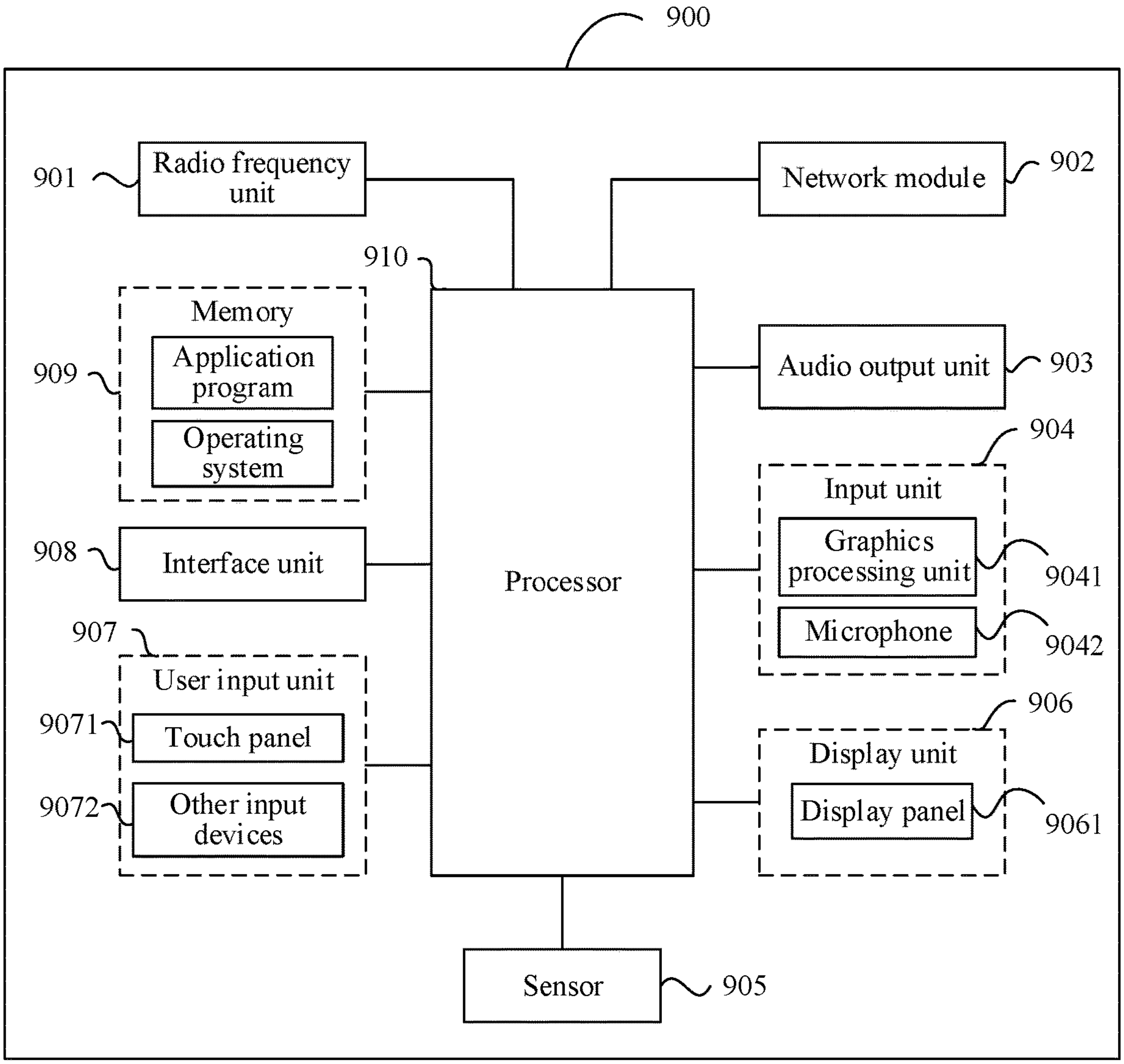
FIG. 9 is a second schematic structural diagram of a terminal according to an embodiment of this application.

FIG. 9 is a schematic diagram of a hardware structure of a terminal for implementing an embodiment of this application. The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the terminal 900 may further include a power supply (for example, a battery) supplying power to all components. Optionally, the power supply may be logically connected to the processor 910 through a power management system. In this way, functions such as charge management, discharge management, and power consumption management are implemented by using the power management system. The terminal structure shown in FIG. 9 does not constitute a limitation on the terminal. The terminal may include more or fewer components than those shown in the figure, or some components are combined, or component arrangements are different. Details are not described herein again.

It should be understood that, in this embodiment of this application, the input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, or the like. The user input unit 907 includes a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 901 sends the downlink data to the processor 910 for processing, and in addition, sends uplink data to the network-side device. Generally, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may primarily include a program or instruction storage area and a data storage area. The program or instruction storage area may store an operating system, an application program or instructions (such as an audio play function and an image play function) required by at least one function, and the like. In addition, the memory 909 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 910 may include one or more processing units. Optionally, the processor 910 may integrate an application processor and a modem processor. The application processor mainly processes the operating system, a user interface, an application program, or an instruction. The modem processor mainly processes wireless communication. For example, the modem processor is a baseband processor. It can be understood that the modem processor may alternatively be not integrated in the processor 910.

The radio frequency unit 901 is configured to send a first reconfiguration message to a relay terminal, where the first reconfiguration message carries configuration information of a first radio link control RLC bearer; and send a second reconfiguration message to a second terminal, or send, by the relay terminal, a second reconfiguration message to a second terminal, where the second reconfiguration message carries configuration information of a second RLC bearer.

Alternatively, the radio frequency unit 901 is further configured to receive a first reconfiguration message sent by a first terminal, where the first reconfiguration message carries configuration information of a first radio link control RLC bearer; and send a second reconfiguration message to a second terminal, or send, by the first terminal, a second reconfiguration message to a second terminal, where the second reconfiguration message carries configuration information of a second RLC bearer.

Alternatively, the radio frequency unit 901 is further configured to receive a second reconfiguration message sent by a first terminal or a relay terminal, where the second reconfiguration message carries configuration information of a second RLC bearer.

In this embodiment of this application, the first terminal sends the first reconfiguration message to the relay terminal, and the first terminal sends the second reconfiguration message to the second terminal, or the relay terminal sends the second reconfiguration message to the second terminal, so that consistent configurations can be performed among the first terminal, the relay terminal, and the second terminal. In this way, bearer or data flow transmission from a remote terminal to the relay terminal and finally to a target terminal is implemented, quality of service QoS of the remote terminal is ensured, and system efficiency is ensured, while user experience is improved.

It should be noted that the bearer configuration apparatus provided in this embodiment of this application is an apparatus capable of performing the foregoing bearer configuration method, and all embodiments of the foregoing bearer configuration method are applicable to the apparatus, with the same or similar beneficial effects achieved.

An embodiment of this application further provides a readable storage medium. The readable storage medium stores a program or instructions. When the program or instructions are executed by a processor, each process of the foregoing bearer configuration method embodiment is implemented, with the same technical effect achieved. To avoid repetition, details are not described herein again.

The processor is the processor in the electronic device described in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions to implement each process of the foregoing bearer configuration method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bearer configuration method, applied to a first remote terminal and comprising:

sending a first reconfiguration message to a relay terminal, wherein the first reconfiguration message carries configuration information of a first radio link control (RLC) bearer; wherein the configuration information of the first RLC bearer is used to indicate establishment of an RLC bearer between the first remote terminal and the relay terminal; the first reconfiguration message is used by the relay terminal to send a second reconfiguration message to a second remote terminal;

in L2 architecture, between the first remote terminal and the relay terminal, there exist an RLC protocol stack, a media access control (MAC) protocol stack, and a physical (PHY) protocol stack; in L3 architecture, between the first remote terminal and the relay terminal, there exist an RLC protocol stack, a MAC protocol stack, a PHY protocol stack, a radio resource control (RRC) protocol stack, a service data adaptation protocol (SDAP) protocol stack, and a packet data convergence protocol (PDCP) protocol stack.

2. The method according to claim 1, wherein the configuration information of the first RLC bearer is also used to indicate establishment of an RLC bearer between the second remote terminal and the relay terminal.

3. The method according to claim 1, wherein the second reconfiguration message carries configuration information of a second RLC bearer;

wherein the second reconfiguration message further carries first indication information, and the first indication information indicates that the configuration information of the second RLC bearer is used for establishment of an RLC bearer between the second remote terminal and the relay terminal.

4. The method according to claim 1, wherein the first reconfiguration message further carries configuration information of a first sidelink radio bearer (SLRB) between the first remote terminal and the relay terminal; and the second reconfiguration message further carries configuration information of a second SLRB between the second remote terminal and the relay terminal.

5. The method according to claim 3, wherein the second reconfiguration message further carries configuration information of a third sidelink radio bearer (SLRB) between the first remote terminal and the second remote terminal;

wherein the configuration information of the third SLRB comprises identification information of a PC5 link associated with the third SLRB.

6. The method according to claim 3, wherein the configuration information of the first RLC bearer and the configuration information of the second RLC bearer carry identification information of a sidelink radio bearer (SLRB) associated with the corresponding RLC bearer;

wherein the configuration information of the first RLC bearer and the configuration information of the second RLC bearer further carry identification information of a PC5 link associated with the corresponding RLC bearer.

7. A bearer configuration method, applied to a relay terminal and comprising:

receiving a first reconfiguration message sent by a first remote terminal, wherein the first reconfiguration message carries configuration information of a first radio link control (RLC) bearer, wherein the configuration information of the first RLC bearer is used to indicate establishment of an RLC bearer between the first remote terminal and the relay terminal; the first reconfiguration message is used by the relay terminal to send a second reconfiguration message to a second remote terminal; and sending the second reconfiguration message to the second remote terminal, wherein the second reconfiguration message carries configuration information of a second RLC bearer;

in L2 architecture, between the first remote terminal and the relay terminal, there exist an RLC protocol stack, a media access control (MAC) protocol stack, and a physical (PHY) protocol stack; in L3 architecture, between the first remote terminal and the relay terminal, there exist an RLC protocol stack, a MAC protocol stack, a PHY protocol stack, a radio resource control (RRC) protocol stack, a service data adaptation protocol (SDAP) protocol stack, and a packet data convergence protocol (PDCP) protocol stack.

8. The method according to claim 7, wherein the configuration information of the first RLC bearer is also used to indicate establishment of an RLC bearer between the second remote terminal and the relay terminal.

9. The method according to claim 7, wherein the configuration information of the second RLC bearer is used to indicate establishment of an RLC bearer between the second remote terminal and the relay terminal.

10. The method according to claim 7, wherein the first reconfiguration message further carries configuration information of a first sidelink radio bearer (SLRB) between the first remote terminal and the relay terminal; and the second reconfiguration message further carries configuration information of a second SLRB between the second remote terminal and the relay terminal.

11. The method according to claim 10, wherein the configuration information of the first RLC bearer and the configuration information of the second RLC bearer carry identification information of an SLRB associated with the corresponding RLC bearer;

wherein the configuration information of the first RLC bearer and the configuration information of the second RLC bearer further carry identification information of a PC5 link associated with the corresponding RLC bearer.

12. The method according to claim 10, further comprising:

maintaining a mapping relationship between the first SLRB and the second SLRB;

and/or maintaining a mapping relationship between the first RLC bearer and the second RLC bearer;

the method further comprising:

maintaining a mapping relationship between RLC bearers associated with a same SLRB.

13. A bearer configuration method, applied to a second remote terminal and comprising:

receiving a second reconfiguration message sent by a relay terminal, wherein the second reconfiguration message carries configuration information of a second radio link control (RLC) bearer, the configuration information of the second RLC bearer is used to indicate establishment of an RLC bearer between the second remote terminal and the relay terminal; the second reconfiguration message is sent by the relay terminal based on a first reconfiguration message sent by a first remote terminal to the relay terminal;

in L2 architecture, between the second remote terminal and the relay terminal, there exist an RLC protocol stack, a media access control (MAC) protocol stack, and a physical (PHY) protocol stack; in L3 architecture, between the second remote terminal and the relay terminal, there exist an RLC protocol stack, a MAC protocol stack, a PHY protocol stack, a radio resource control (RRC) protocol stack, a service data adaptation protocol (SDAP) protocol stack, and a packet data convergence protocol (PDCP) protocol stack.

14. The method according to claim 13, wherein the second reconfiguration message further carries configuration information of a second sidelink radio bearer (SLRB) between the second remote terminal and the relay terminal.

15. A terminal, comprising a processor, a memory, and a program or instructions stored in the memory and capable of running on the processor, wherein when the program or instructions are executed by the processor, the steps of the bearer configuration method according to claim 1 are implemented.

16. A terminal, comprising a processor, a memory, and a program or instructions stored in the memory and capable of running on the processor, wherein when the program or instructions are executed by the processor, the steps of the bearer configuration method according to claim 7 are implemented.

17. A terminal, comprising a processor, a memory, and a program or instructions stored in the memory and capable of running on the processor, wherein when the program or instructions are executed by the processor, the steps of the bearer configuration method according to claim 13 are implemented.

* * * * *